Jan. 9, 1951   R. W. McALLISTER, JR   2,537,904
METHOD OF WASHING ACIDIFIED FINELY DIVIDED SOLIDS
Filed Dec. 13, 1946

Inventor
Robert W. McAllister Jr.
By W. S. McDowell
Attorney

Patented Jan. 9, 1951

2,537,904

UNITED STATES PATENT OFFICE 2,537,904

METHOD OF WASHING ACIDIFIED FINELY DIVIDED SOLIDS

Robert W. McAllister, Jr., Zanesville, Ohio, assignor to The Central Silica Company, Zanesville, Ohio, a corporation of Ohio Application December 13, 1946, Serial No. 716,047

9 Claims. (Cl. 134—25)

My invention relates to methods of neutralization, and has particular reference to a method or process for chemically neutralizing previously acidulated solid materials such as sand and gravel.

In the purification of silica sand for industrial purposes, particularly where sand is utilized in the manufacture of glass or pottery, it becomes necessary to treat the raw sand with a corrosive acid, such as sulphuric acid, to remove certain metallic impurities by forming water soluble salts of the metals. Foremost among the impurities present in raw sand is iron, which tends to produce an undesirable decoloration in glassware and pottery, when such sand is utilized in their production. Hence, it is common practice in the production of refined sand to remove the iron and other impurities by treating the sand with sulphuric acid which forms the soluble iron sulphate salt, which is afterwards removed from the sand by decantation or other mechanical means. It will be understood, however, that after treating the sand with acid to remove the impurities, it becomes necessary to completely remove all traces of the acid and salt solution by a neutralizing process. Formerly, this was accomplished by removing the previously acidulated sand in batches and treating the same with a suitable basic material to render the acid neutral, or by mechanically leaching or washing the sand with large quantities of water to remove the acid. It will be manifest, that such operations required considerable time and care, and consequently, greatly increased the cost of manufacture, by nature of the interruption in an otherwise substantially continuous process.

Accordingly, it is a foremost object of this invention to provide a method for the treatment of previously acidulated solids, whereby the solids material are chemically neutralized in a substantially continuous and uninterrupted manner.

It is another object of my invention to provide a method for neutralizing acid-treated sand through a simple and relatively inexpensive washing process, in which the sand particles are efficiently and thoroughly cleansed and freed from acid by washing the same with water, and by self-attrition caused by the gravitational flow of the sand particles over a downwardly inclined surface during such washing.

For purposes of explanation, reference is made to the following description of my improved methods and the accompanying drawings, wherein.

Figure 1:
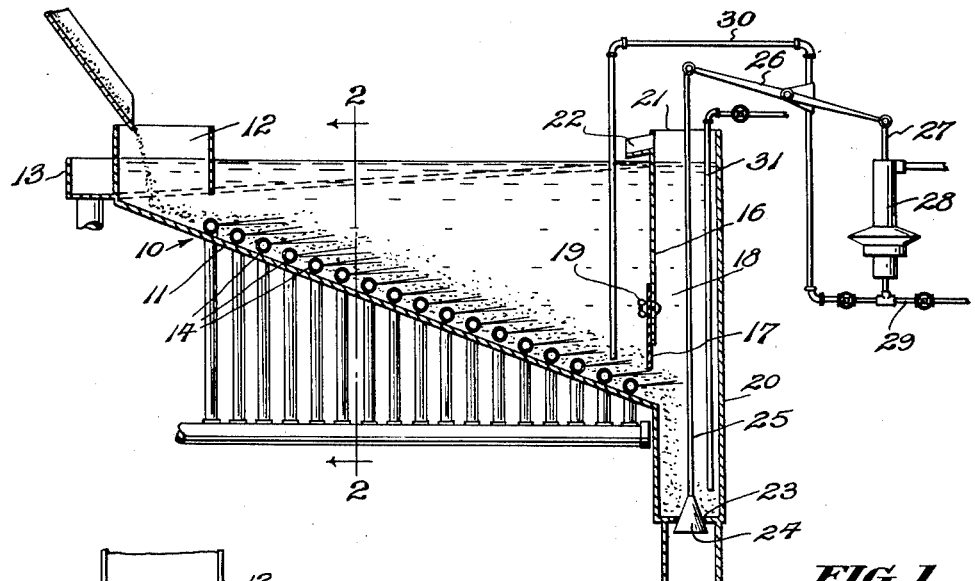
Fig. 1 is a longitudinal vertical sectional view taken through one form of apparatus used to carry out my continuous sand neutralizing methods.
Figure 2:
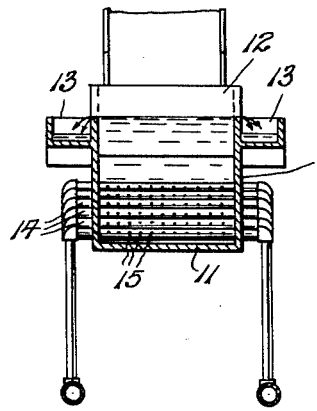
Fig. 2 is a transverse vertical sectional view taken along the line 2—2 of Fig. 1.
Figure 3:
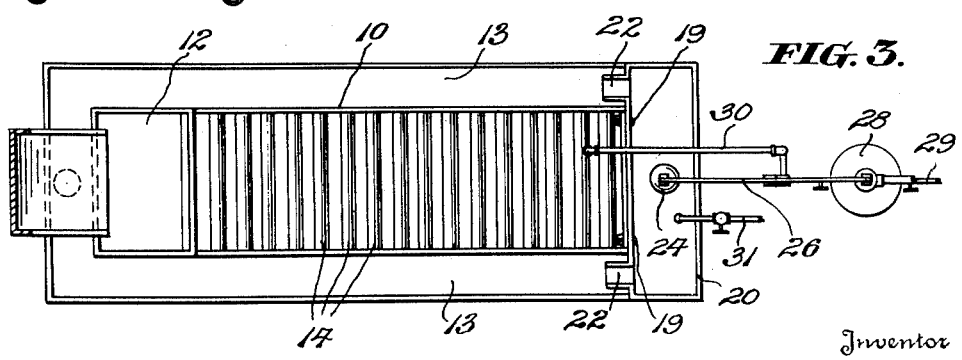
Fig. 3 is a top plan view of the apparatus of Fig. 1.

Referring more particularly to the apparatus illustrated in the drawings, it will be noted that the system embodies an elongated receptacle or vat 10 formed with a downwardly inclined bottom 11. The vat 10 is provided at one end with a vertically positioned intake chute 12 which serves to receive incoming acidified sand. On either side, and just below the upper edges of the vat, are a pair of troughs 13 which receive and discharge over-flowing solution from the upper portion of the vat.

Arranged along the inclined bottom of the vat 10 are a plurality of transversely disposed conduits 14 which are provided with a series of discharge openings 15 along their lengths. The openings 15 of the conduits are disposed so as to project substantially longitudinally of the vat, in a horizontal plane, and serve to introduce water, or a neutralizing solution such as dilute sodium hydroxide, to the bottom of the vat. The end of the vat opposite to the intake chute is formed with a vertically positioned wall 16 which extends above the upper edges of the side walls of the vats, and is spaced from the bottom wall thereof to provide an opening at the lowermost part of the vat. The bottom of the vertical wall 16 slidably carries a vertically movable gate valve 17 which serves to block the opening provided between the vertical wall and the bottom 11. This valve is manually positionable upon the back wall by means of slots 18 formed in the back wall which receive clamp bolts 19 in order to adjustably maintain the valve in any position respective to the opening between the back wall and the bottom wall of the vat.

Adjacent the rear wall of the vat 10, and communicating with the opening between the bottom and rear walls of the vat, is a second substantially vertically extending receptacle 20. The upper end of this receptacle is open as at 21, which opening projects substantially above the upper edges of the main vat 10. The upper open end of the vertical receptacle is also provided with a spill chute 22 which also communicates with the longitudinally extending side troughs 13. The bottom of the vertical receptacle 20 is provided with a circular discharge opening 23 which receives a pressure responsive conical shaped closure valve 24. This valve is carried at the end of a vertically positioned shaft 25 which extends upwardly out of the vertical receptacle 20 and is connected with the outer end with a pivoted lever arm 26. The opposite end of this arm is connected with a vertically movable piston rod 27 carried within a tubular diaphragm cylinder 28.

A vertically movable diaphragm is carried internally of the cylinder and is linked with the piston rod 27, and acts in response to pressure entering the cylinder 28 at its bottom end by means of a branch conduit 29. The latter communicates with a main conduit 30 whose end projects downwardly into the main vat 10 and terminates adjacent the opening formed between the vertical back wall 16 and the bottom wall 11. In operation, fluid is introduced to the main conduit and passes therethrough to the open end where, if restricted, a back pressure is created to expand the diaphragm located in the cylinder and consequently raise the piston rod to open the closed valve located in the circular opening at the bottom of the vertical receptacle. Also extending downwardly to the bottom of the vertical receptacle is a water conduit 31 which serves to provide washing fluid to the bottom of the vertical receptacle.

In operation, previously acidified sand, as heretofore described, is introduced to the apparatus by way of the intake chute 12, and tends to flow downwardly along the inclined bottom of the vat by gravity. As the sand moves downwardly over the bottom, water is discharged through the openings 15 of the conduits 14 in a substantially horizontal direction, which causes the particles of sand to be slightly dispersed and further mobilized to insure complete surface contact with the water entering the vat. The static head pressure of the water entering through the openings 15 should be such as to diffuse the particles of sand but insufficient to suspend the same or carry them upwardly into the vat. The streams of water discharged from the openings 15 will tend merely to advance the particles of sand toward the back wall 16 in a manner to produce relative motion between the particles but which is best illustrated as a rolling action in which the particles undergo self attrition which further aids in the washing and scrubbing to remove the acid adhering to the outer surfaces of the individual sand particles. As the sand particles progress downwardly over the inclined bottom wall, it will be seen that a more complete washing will ensue, and the washing liquid will eventually be directed upwardly and overflow from the upper edges of the vat into the spill trough 13.

As the sand particles reach the lowermost part of the vat 10, a substantial level will be created thereby, due to the restricted opening formed between the gate valve 17 and the bottom wall 11, with the sand particles backing up against the valve. This level will be determined entirely by the size of the opening provided by the valve, and by the amount of sand entering the vat through the intake chute. The opening between the valve and the bottom wall should be determined to provide a back log or leveling height which will not hamper the downward progress of the incoming sand particles along the inclined bottom wall.

It will be seen that as the back log of sand builds up above the discharge opening, a washing fluid maintained above this level will be held against discharge through the opening by nature of the sand particles which block the same. At the same time, the washed sand adjacent the opening will be discharged therethrough and enter the vertical receptacle 20 where it is subject to upward flowing currents of water entering the vertical receptacle through the conduit 31. The head pressure and water entering the vertical chamber should be regulated to provide for the substantial dispersal of the incoming sand particles, but should also prevent the same from being suspended and carried upwardly to be discharged through its open upper end. If this is complied with, the particles entering the vertical receptacle will flow by gravity downwardly to and be disposed upon its bottom wall over the circular discharge opening 23.

The sand particles entering the vertical receptacle are further washed to remove any remaining traces of acid left after the primary washing received in the main vat 10. Any acid present at this stage will be carried upwardly of the vertical receptacle and will be discharged from the spill chute 22 into the troughs 13.

The closure valve 24 disposed within the discharge opening formed at the bottom of the vertical receptacle, is operated as heretofore disclosed by the diaphragm cylinder 28. The open end of the main conduit 30, is positioned so as to project within the back log formed by the leveling sand particles adjacent the discharge opening of the main vat. It will be seen that as the level of the sand particles increases, the corresponding pressure created by the mass upon the open end of the conduit will cause an increase of pressure upon the diaphragm and thus operate the piston rod to open the closed valve 24 and release the completely washed sand deposited in the bottom of the receptacle 20. As this sand is discharged, it will be understood that the level of the back log adjacent the discharge opening in the main vat will be decreased and will constantly relieve the pressure upon the diaphragm, causing the closure valve to close the opening 23.

While the above operation is necessarily described as a series of functional steps, it will be understood that the operation of the vat along with its valve mechanisms and intake will be substantially continuous, with the rate of discharge of the completely washed sand from the opening 23 corresponding directly to the rate of intake of acidified sand introduced through the intake chute 12.

It will be important to note that due to the vertical height of the receptacle 20 above the height of the main vat 10, a considerably greater head pressure will be created in the former which will tend to hold back any liquid entering with the particles of sand through the gate valve 17. In addition to this, the resistance offered to the liquid in the vat 10 by the back log or pile-up of sand in front of the valve will cause the same to seek the paths of least resistance and to constantly overflow the upper edges of the main vat, thus providing at all times a continuous flow of fresh washing liquid over the incoming sand particles.

I have found through experimentation that by positioning the bottom of the vat 10 at an angle approximately 20 degrees above the horizontal, the best attritional results are obtained with the incoming sand particles being advanced at a relatively slow rate in a rolling movement.

I have also found that after a very short operational time, the water overflowing from the top of the vertical receptacle 20 may be tested with a suitable indicator such as methyl orange and has been found entirely free from acid content.

In view of the foregoing, it will be seen that my improved methods utilizing the gravitational attritional flow in conjunction with the dispersal washing provides means whereby previously acidified sand, bearing extremely high concentrations of acid, may be rendered free thereof in a substantially continuous uninterrupted operation. In so doing, the cost of sand refining is greatly reduced and the purity of the final product is increased over that which was previously provided in batch treatments. Further, my method utilizes to the fullest extent the washing qualities of the incoming washing fluid, and greatly saves on the amount of fluid necessary to produce the desired washing neutralizing action.

I claim:

1. The method of washing previously acidulated finely divided solids which comprises delivering the solids to the upper end of a downwardly inclined surface, the latter being of such inclination to allow said solids to pass thereover in a substantially continuous gravitational flow, simultaneously washing said solids with substantially horizontally flowing currents of an acid-neutralizing liquid having a static head pressure sufficient to diffuse and further mobilize said solids to insure complete surface contact with the liquid, withdrawing said solids from the liquid at the lower end of the inclined surface by restricted gravitational flow, and introducing said withdrawn solids to an upwardly directed flow of water.

2. The method of washing previously acidulated granular solids which consists in causing said solids to flow downwardly over an inclined surface, simultaneously bringing said solids into contact with substantially horizontally flowing water so as to diffuse and further mobilize the same to insure complete surface contact with the water, withdrawing said solids from the water by gravitational flow, and introducing the withdrawn solids to an upwardly directed flow of water.

3. The method of washing acidified granular solids which comprises delivering said solids to the upper end of a downwardly inclined surface having sufficient slope to permit the solids to pass thereover in relatively moving layers under gravitational flow, simultaneously subjecting the mobile solids to substantially horizontally directed currents of washing fluid having sufficient head pressure to disperse the solids to insure complete surface contact with the fluid, partially trapping the solids at the lower end of the inclined surface, separating the solids from the washing fluid by restricted gravitational flow, and introducing the separated solids to an upwardly directed flow of washing fluid.

4. The method of washing acidified granular solids to remove acid therefrom which comprises introducing the solids into the upper portion of a receptacle containing a body of washing fluid, simultaneously introducing jets of washing fluid into said receptacle substantially at the bottom thereof to cause longitudinal advance of the solids through the fluid in a generally downwardly inclined direction, trapping said solids at the end of said receptacle opposite to that into which they are introduced, separating the trapped solids from the fluid by removing the same from the bottom of the receptacle by gravitational flow, and subjecting the separated solids to an upwardly directed flow of additional quantities of washing fluid.

5. The method of washing acidified granular solids to remove acid therefrom which comprises introducing the solids into the upper portion of a receptacle containing a body of washing fluid, simultaneously introducing jets of washing fluid into said receptacle substantially at the bottom thereof to cause longitudinal advance of the solids through the fluid in a generally downwardly inclined direction, trapping said solids at the end of said receptacle opposite to that into which they are introduced, separating the trapped solids from the fluid by removing the same from the bottom of the receptacle by gravitational flow, subjecting the separated solids to an upwardly directed flow of additional quantities of washing fluid, and removing said solids from the upwardly flowing washing fluid by allowing the same to settle by gravity and be discharged below the upwardly flowing fluid.

6. The method of washing previously acidified granular solids to remove acid therefrom which comprises introducing the acidified solids into the upper portion of one end of a receptacle containing continuously overflowing quantities of washing fluid, simultaneously introducing substantially horizontally directed jets of washing fluid into said receptacle substantially at the bottom thereof to cause dispersion and longitudinal advance of the solids through the fluid in a generally downwardly inclined direction, trapping said solids at the end of said receptacle opposite to that into which they are introduced, separating the trapped solids from the washing fluids by discharging the same from the bottom of the receptacle by gravitational flow, and introducing the solids to additional quantities of washing fluid flowing in an upward direction.

7. The method of washing previously acidified granular solids to remove acid therefrom which comprises introducing the acidified solids into the upper portion of one end of a receptacle containing continuously overflowing quantities of washing fluid, simultaneously introducing substantially horizontally directed jets of washing fluid into said receptacle substantially at the bottom thereof to cause dispersion and longitudinal advance of the solids through the fluid in a generally downwardly inclined direction, trapping said solids at the end of said receptacle opposite to that into which they are introduced, separating the trapped solids from the washing fluids by discharging the same from the bottom of the receptacle by gravitational flow, introducing the solids to additional quantities of washing fluid flowing in an upward direction, and afterwards allowing the solids to settle out of the upwardly flowing fluid by gravity to be separated therefrom.

8. The method of washing previously acidulated finely divided solids which comprises introducing the solids within a body of upwardly flowing acid-neutralizing liquid, causing said solids to progress downwardly in an inclined plane through said body of liquid, simultaneously subjecting said solids to agitating streams of acid-neutralizing liquid directed in acutely angular relation to the inclined plane of passage of said solids, extracting said solids from said body of liquid by gravitational flow, and afterwards subjecting said solids to a second body of upwardly flowing acid-neutralizing liquid.

9. The method of washing previously acidulated finely divided solids which comprises directing such solids downwardly in an inclined plane through a body of overflowing acid-neutralizing liquid, simultaneously subjecting said solids to substantially horizontally directed agitating streams of acid-neutralizing liquid, extracting said solids from said body of liquid by gravitational flow, and afterwards subjecting the extracted solids to upwardly flowing currents of wash water.

ROBERT W. McALLISTER, JR.

REFERENCES CITED

The following references are of record in the file of this patent:

UNITED STATES PATENTS

| Number | Name | Date |
| --- | --- | --- |
| 353,775 | Booraem | Dec. 7, 1886 |
| 654,647 | Koppelmann | July 31, 1900 |
| 1,474,893 | Crocker | Nov. 20, 1923 |
| 1,544,894 | Farnsworth | July 7, 1925 |
| 1,736,813 | Zuckerman | Nov. 26, 1929 |
| 2,382,317 | Hoff | Aug. 14, 1945 |
| 2,418,126 | Spalding | Apr. 1, 1947 |